(12) United States Patent
Jeon et al.

(10) Patent No.: US 9,178,197 B2
(45) Date of Patent: Nov. 3, 2015

(54) LITHIUM SECONDARY BATTERY

(71) Applicant: LG Chem, Ltd., Seoul (KR)

(72) Inventors: Jong-Ho Jeon, Daejeon (KR);
Yong-Gon Lee, Daejeon (KR);
Seung-Woo Chu, Daejeon (KR);
Shul-Kee Kim, Daejeon (KR);
Hyun-Yeong Lee, Daejeon (KR);
Jae-Deok Jeon, Daejeon (KR)

(73) Assignee: LG Chem, Ltd. (KR)

( * ) Notice: Subject to any disclaimer, the term of this patent is extended or adjusted under 35 U.S.C. 154(b) by 201 days.

(21) Appl. No.: 14/090,712

(22) Filed: Nov. 26, 2013

(65) Prior Publication Data

US 2014/0093758 A1 Apr. 3, 2014

Related U.S. Application Data

(63) Continuation of application No. PCT/KR2013/004839, filed on May 31, 2013.

(30) Foreign Application Priority Data

May 31, 2012 (KR) .................. 10-2012-0058840
May 31, 2013 (KR) .................. 10-2013-0062704

(51) Int. Cl.
*H01M 2/12* (2006.01)
*H01M 10/052* (2010.01)
(Continued)

(52) U.S. Cl.
CPC .......... *H01M 2/1276* (2013.01); *H01M 10/052* (2013.01); *H01M 10/0567* (2013.01); *H01M 10/0569* (2013.01); *H01M 10/0568* (2013.01); *Y02E 60/122* (2013.01)

(58) Field of Classification Search
CPC .......... H01M 10/052; H01M 10/0567; H01M 10/0568; H01M 10/0569; H01M 2/1276
USPC .......................................................... 429/56
See application file for complete search history.

(56) References Cited

U.S. PATENT DOCUMENTS 5,741,606 A * 4/1998 Mayer et al. ........ H01M 2/1229
429/53
5,821,008 A 10/1998 Harada et al.
(Continued)

FOREIGN PATENT DOCUMENTS

CN 101663790 A 3/2010
JP 2005-243490 A 9/2005
(Continued)

OTHER PUBLICATIONS http://www.calculator.org/property.aspx?name=pressure, Flow Simulation Ltd., 2010.*

(Continued)

*Primary Examiner* — Jonathan Jelsma
*Assistant Examiner* — Rashid Alam
(74) *Attorney, Agent, or Firm* — Lerner, David, Littenberg, Krumholz & Mentlik, LLP

(57) ABSTRACT

The present invention provides a lithium secondary battery, comprising a cathode, an anode, a non-aqueous solution containing a lithium salt and an organic solvent, and a safety vent for removing increased internal pressure, the non-aqueous solution having the prescribed composition and the safety vent having the prescribed operational characteristics. The lithium secondary battery of the present invention can ensure its safety even when overcharged.

9 Claims, 1 Drawing Sheet

(51) Int. Cl.
*H01M 10/0567* (2010.01)
*H01M 10/0569* (2010.01)
*H01M 10/0568* (2010.01)

(56) References Cited

U.S. PATENT DOCUMENTS

| | | |
|---|---|---|
| 5,916,704 A | 6/1999 | Lewin et al. |
| 2004/0228061 A1 | 11/2004 | Kim et al. |
| 2010/0099031 A1 | 4/2010 | Kato et al. |
| 2011/0014507 A1 | 1/2011 | Wu et al. |

FOREIGN PATENT DOCUMENTS

| | | |
|---|---|---|
| KR | 10-2004-0057362 | 7/2004 |
| KR | 100619631 | 8/2006 |
| KR | 10-0706654 | 5/2007 |
| TW | 200532963 A | 2/1994 |

OTHER PUBLICATIONS

Supplemental Search Report from corresponding European Application No. 13 79 7867, dated Jun. 16, 2015.

* cited by examiner

LITHIUM SECONDARY BATTERY

CROSS-REFERENCE TO RELATED APPLICATION

This application is a continuation of International Application No. PCT/KR2013/004839 filed on May 31, 2013, which claims priority under 35 USC 119(a) to Korean Patent Application No. 10-2012-0058840 filed in the Republic of Korea on May 31, 2012, and Korean Patent Application No. 10-2013-0062704 filed on May 31, 2013, the disclosures thereof are incorporated herein by reference.

TECHNICAL FIELD

The present invention relates to a lithium secondary battery, more specifically to a lithium secondary battery comprising a safety vent for reducing increased internal pressure and a non-aqueous electrolyte solution having particular components.

BACKGROUND ART

Recently, there has been growing interest in energy storage technologies. As energy storage technologies are extended to devices such as cellular phones, camcorders and notebook PC, and further to electric vehicles, demand for high energy density of batteries used as a source of power supply of such devices is increasing. Therefore, research and development of lithium secondary batteries, which most meet the demand, are actively being conducted.

As well known in the art, conventional lithium secondary batteries have a cathode made of lithium-containing oxide and an anode made of carbon-based materials, which can intercalate or disintercalate lithium ions, a separator for acting as a bridge between the anode and the cathode to prevent an electrical contact therebetween, and a non-aqueous electrolyte.

Also, in the case that such a battery is manufactured in a prismatic form, it further has a safety vent which exhausts a great deal of gas generated from the decomposition of the non-aqueous electrolyte during the abnormal operation of the battery, e.g., overcharging, thereby preventing an additional explosion and/or ignition.

FIGS. 1 to 3 show a safety vent which is formed at a side of the case of prismatic batteries and has a closed or partially opened groove.

In FIG. 1, a safety vent 10 is formed on an outer surface of a prismatic secondary battery case 20 in a large contour corresponding to the rectangular side shape of the case, and has a groove 30 formed along such a contour, i.e., a closed groove. In contrast, safety vents 12 and 14, as shown in FIGS. 2 and 3, respectively, are formed in the corner on a side of a battery case in a small contour, and each of them have a partially opened groove 30.

If an excessive amount of gas is generated inside of the battery due to overcharging, the groove 30 is cut by the internal pressure of the battery to form a vent hole (the opening of the vent hole), from which internal gas is exhausted outward to prevent the explosion or ignition of the battery.

However, the safety vent should not open due to its excessive sensitiveness even when there is no danger of explosion and/or ignition since the gas generated in the battery is combustible and harmful, and thus may induce environmental problems.

Accordingly, there is a need to develop a lithium secondary battery having a non-aqueous solution capable of reducing gas generation and a safety vent capable of properly operating when the battery operates abnormally due to overcharging.

DISCLOSURE

Technical Problem

The present invention is designed to solve the above-mentioned problems, and therefore it is an object of the present invention to provide a lithium secondary battery having a non-aqueous solution, which can inhibit the decomposition of the non-aqueous solution even when overcharged, and particularly inhibit the operation of a safety vent to avoid the explosion or ignition of the battery.

Technical Solution

In order to accomplish the above object, in accordance with one aspect of the present invention, there is provided a lithium secondary battery, comprising a cathode, an anode, a non-aqueous solution containing a lithium salt and an organic solvent, and a safety vent for removing increased internal pressure, wherein the safety vent has a vent hole whose opening pressure is in the range of 3.5 to 15 kgf/cm$^2$; and the non-aqueous solution further contains a mixture of halogen-substituted or unsubstituted toluene and halogen-substituted or unsubstituted xylene as an additive, the mixture having the halogen-substituted or unsubstituted toluene and the halogen-substituted or unsubstituted xylene in a weight ratio of 1:0.1 to 1:0.5.

In the lithium secondary battery of the present invention, the halogen-substituted toluene may be a compound having at least one substituent selected from F and Cl in the benzene ring or methyl group of toluene, and the halogen-substituted xylene may be a compound having at least one substituent selected from F and Cl in the benzene ring or methyl groups of xylene.

Advantageous Effects

The lithium secondary battery of the present invention uses a non-aqueous solution containing toluene-based and/or xylene-based additives to minimize gas generation at a high temperature, thereby preventing the internal pressure of the battery from being raised, and also, has a safety vent whose vent hole has good restraint against opening. Accordingly, the lithium secondary battery of the present invention is surprisingly safe even when overcharged.

DESCRIPTION OF DRAWINGS

Other objects and aspects of the present invention will become apparent from the following descriptions of the embodiments with reference to the accompanying drawings in which.

BEST MODE

Figure 1:
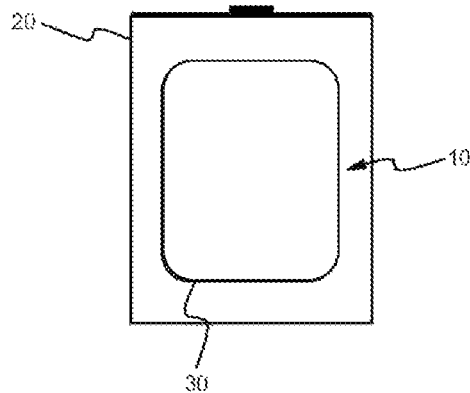
FIGS. 1 to 3 are schematic diagrams showing the shapes of safety vents conventionally used in a secondary battery.
Figure 2:
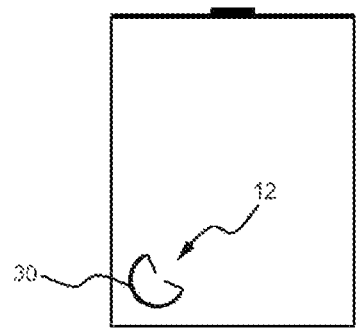
Figure 3:
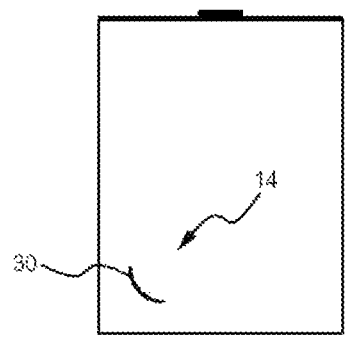

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

The lithium secondary battery of the present invention comprises a cathode and an anode capable of intercalating and disintercalating lithium ions, a non-aqueous solution containing a lithium salt and an organic solvent, and a safety vent for removing increased internal pressure, wherein the safety vent has a vent hole whose opening pressure is controlled in the range of 3.5 to 15 kgf/cm$^2$; and the non-aqueous solution further contains halogen-substituted or unsubstituted toluene, halogen-substituted or unsubstituted xylene or a mixture thereof as an additive.

In the lithium secondary battery of the present invention, if the vent hole of the safety vent has an opening pressure less than 3.5 kgf/cm$^2$, the safety vent operates even though there is no danger of explosion and/or ignition to release internal harmful gas outward, while if the vent hole has an opening pressure higher than 15 kgf/cm$^2$, the battery may explode or ignite by excessive internal pressure before the safety vent operates.

Meanwhile, in the present invention, the non-aqueous solution which is introduced in an electrode assembly further contains a mixture of halogen-substituted or unsubstituted toluene and halogen-substituted or unsubstituted xylene as an additive.

The term "the halogen-substituted toluene" used herein refers to a compound having at least one substituent selected from F and Cl in the benzene ring or methyl group of toluene.

The term "halogen-substituted xylene" used herein refers to a compound having at least one substituent selected from F and Cl in the benzene ring or methyl groups of xylene.

The halogen-substituted or unsubstituted toluene and the halogen-substituted or unsubstituted xylene, which are contained in the non-aqueous solution according to the present invention is first oxidized prior to the organic solvent under high voltage conditions, e.g., overcharging, to form a coating film on the anode, thereby preventing the decomposition of the organic solvent. That is, since such toluene and xylene present in the non-aqueous solution are oxidized in their aldehyde form by the reaction of a methyl group thereof with the overcharged cathode, before oxidation of the organic solvent, the decomposition of the organic solvent can be prevented. Also, the resulting aldehyde compounds are reduced in the anode to form a coating film on lithium present in the reactive resin of the anode, thereby preventing the organic solvent from being further decomposed.

Therefore, a mixture of the halogen-substituted or unsubstituted toluene and the halogen-substituted or unsubstituted xylene can inhibit a decomposition reaction of an electrode solution when a battery is overcharged, to provide battery safety against overcharging, and also can minimize gas generation to prevent environmental pollution due to the opening of the vent hole.

In the present invention, the halogen-substituted or unsubstituted toluene and the halogen-substituted or unsubstituted xylene is mixed in a weight ratio of 1:0.1 to 1:0.5. If the amount of halogen-substituted or unsubstituted xylene is less than the lower limit of such range, the gas generation may not be inhibited efficiently during overcharging. If the amount of the halogen-substituted or unsubstituted xylene exceeds such range, the xylene may be subject to high-temperature decomposition to increase internal resistance, thereby deteriorating high-temperature characteristics.

In the present invention, the mixture as an additive is preferably contained in an amount of 1 to 10 parts by weight based on 100 parts by weight of the non-aqueous solution. If the amount of the additive is less than 1 part by weight, the prevention of overcharging and the formation of a stable coating film may become difficult and due to the gas being further generated, the safety vent will operate excessively earlier. If the amount of the additive is higher than 10 parts by weight, an excessive amount of benzene compounds are added, thereby deteriorating battery performances.

Thus, the above-mentioned vent hole having the desired opening pressure and the non-aqueous electrolyte solution having a particular additive can be used to achieve a lithium secondary battery having superior performances.

In the lithium secondary battery of the present invention, organic solvents which are conventionally used in a non-aqueous electrolyte solution may be used without any limitation. For example, carbonate-based organic solvent, such as a cyclic carbonate, a linear carbonate and a mixture thereof may be used.

The cyclic carbonate can favorably dissociate a lithium salt in an electrolyte to improve the charging and discharging capacity of batteries. Examples of the cyclic carbonate include ethylene carbonate, propylene carbonate, 1,2-butylene carbonate, 2,3-butylene carbonate, 1,2-pentylene carbonate, 2,3-pentylene carbonate, vinylene carbonate, a halide thereof, and a mixture thereof. Among these, ethylene carbonate (or fluoroethylene carbonate) and a mixture of ethylene carbonate (or fluoroethylene carbonate) and propylene carbonate are preferred in that they have a high dielectric constant to more easily dissociate a lithium salt in an electrolyte. Such a cyclic carbonate has a density higher than that of the linear carbonate. Examples of the linear carbonate include dimethyl carbonate, diethyl carbonate, dipropyl carbonate, ethyl methyl carbonate, methyl propyl carbonate, ethyl propyl carbonate and a mixture thereof.

Also, as the organic solvent of the non-aqueous solution, a linear ester may be used, and it is preferred that the linear ester is used together with the carbonate-based organic solvent. Examples of the linear ester include methyl acetate, ethyl acetate, propyl acetate, methyl propionate, ethyl propionate, propyl propionate, butyl propionate and a mixture thereof.

In the lithium secondary battery of the present invention, the non-aqueous electrolyte solution comprises a lithium salt as an electrolyte salt. The lithium salt may be any one which is conventionally used in an electrolyte solution for a lithium secondary battery. For example, an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$ but the present invention is not limited thereto.

In addition, the non-aqueous electrolyte solution may further comprise a lactone, an ether, an ester, an acetonitrile, a lactam or a ketone, unless the object of the present invention is not hindered.

More specifically, the non-aqueous electrolyte solution may further comprise an SEI layer-forming additive within a range which does not deviate from the object of the present invention. The SEI layer-forming additive which may be used in the present invention includes vinylene carbonate, vinyl ethylene carbonate, fluoroethylene carbonate, a cyclic sulfite, a saturated sultone, an unsaturated sultone, a non-cyclic sulfone and a mixture thereof, but is not limited thereto. Examples of the cyclic sulfite include ethylene sulfite, methyl ethylene sulfite, ethyl ethylene sulfite, 4,5-dimethyl ethylene sulfite, 4,5-diethyl ethylene sulfite, propylene sulfite, 4,5- dimethyl propylene sulfite, 4,5-diethyl propylene sulfite, 4,6-dimethyl propylene sulfite, 4,6-diethyl propylene sulfite and 1,3-butylene glycol sulfite; examples of the saturated sultone include 1,3-propane sultone and 1,4-butane sultone; examples of the unsaturated sultone include ethene sultone, 1,3-propene sultone, 1,4-butene sultone and 1-methyl-1,3-propene sultone; and examples of the non-cyclic sulfone include divinyl sulfone, dimethyl sulfone, diethyl sulfone, methyl ethyl sulfone and methyl vinyl sulfone. The SEI layer-forming additive may be used in a suitable amount depending on its specific type, for example, in an amount of 0.01 to 10 parts by weights based on 100 parts by weight of the non-aqueous electrolyte solution. The lithium secondary battery of the present invention may have a conventional configuration. For example, a cathode made of lithium-containing oxide and an anode made of carbon-based materials may be used as a cathode and anode capable of intercalating and disintercalating lithium ions, and a separator may be interposed therebetween.

As the carbon-based material capable of intercalating and disintercalating lithium ions, low-crystalline carbon or high-crystalline carbon may be used, but is not limited thereto. Representative examples of the low-crystalline carbon include soft carbon and hard carbon, and representative examples of the high-crystalline carbon include natural graphite, Kish graphite, pyrolytic carbon, mesophase pitch based carbon fiber, meso-carbon microbeads, mesophase pitches, and high-temperature sintered carbon such as petroleum or coal tar pitch derived cokes, but are not limited thereto. Also, the anode may comprise a binder, and as the binder, various kinds of binder polymers including vinylidene fluoride-hexafluoropropylene copolymer (PVDF-co-HFP), polyvinylidene fluoride, polyacrylonitrile, polymethylmethacrylate, a styrene butadiene rubber (SBR) and a modified SBR may be used.

Also, as the lithium-containing oxide capable of intercalating and disintercalating lithium ions, a lithium-containing transition metal oxide may be preferably used, for example, any one selected from the group consisting of $Li_xCoO_2$ ($0.5<x<1.3$), $Li_xNiO_2$($0.5<x<1.3$), $Li_xMnO_2$($0.5<x<1.3$), $Li_xMn_2O_4$($0.5<x<1.3$), $Li_x(Ni_aCo_bM_c)O_2$($0.5<x<1.3$, $0<a<1$, $0<b<1$, $0<c<1$, $a+b+c=1$), $Li_xNi_{1-y}Co_yO_2$($0.5<x<1.3$, $0<y<1$), $Li_xCo_{1-y}Mn_yO_2$($0.5<x<1.3$, $0\le y<1$), $Li_xNi_{1-y}Mn_yO_2$ ($0.5<x<1.3$, $O\le y<1$), $Li_x(Ni_aCo_bMn_c)O_4$($0.5<x<1.3$, $0<a<2$, $0<b<2$, $0<c<2$, $a+b+c=2$), $Li_xMn_{2-z}Ni_zO_4$($0.5<x<1.3$, $0<z<2$), $Li_xMn_{2-z}Co_zO_4$($0.5<x<1.3$, $0<z<2$), $Li_xCoPO_4$ ($0.5<x<1.3$), $LixFePO_4$($0.5<x<1.3$) and a mixture thereof may be used. The lithium-containing transition metal oxide may be coated with a metal such as aluminum (Al) and a metal oxide. In addition, lithium-containing transition metal sulfide, selenide, or halide may also be used.

In the lithium secondary of the present invention, electrodes may be prepared in conventional methods, for example, by adding electrode active material particles and a binder polymer, if necessary, together with a conductive agent and a dispersant, in a solvent to obtain a slurry, and coating the slurry on a current collector, followed by compressing and drying. Also, the separator may be obtained from a porous polymer film which is conventionally used alone or in the form of lamination in conventional separators, for example, porous polymer films made of polyolefin-based polymers such as ethylene homopolymer, propylene homopolymer, ethylene/butene copolymer, ethylene/hexene copolymer and ethylene/methacrylate copolymer. Also, as the separator, conventional porous non-woven fabrics such as a non-woven fabric made of glass fiber having a high melt point or polyethylene terephthalate fiber may be used, but is not limited thereto.

In addition, the assembly of the cathode and anode may be inserted in a conventional battery case, preferably, a prismatic case. The safety vent having the above-mentioned characteristic may be prepared according to conventional methods.

Hereinafter, the present invention will be explained in more detail with reference to the following Examples. However, it should be understood that the Examples are provided for the purpose of illustrations only and to better explain to a person having ordinary skill in the art, and is not intended to limit the scope of the present invention, so other equivalents and modifications could be made thereto without departing from the spirit and scope of the present invention.

EXAMPLES

Examples 1 to 20

Preparation of Non-Aqueous Electrolyte Solution

A mixture of ethylene carbonate, ethyl methyl carbonate and dimethyl carbonate in a volume ratio of 1:1:1 was used as an organic solvent, and $LiPF_6$ as a lithium salt was dissolved therein, to obtain 1M $LiPF_6$ solution. To 100 parts by weight of the solution, 2 parts by weight of vinylene carbonate (VC) and 2 parts by weight of 1,3-propane sultone (PS) were further added. Thereto, a mixture obtained by mixing toluene and xylene in an amount listed in the Table was added.
<Preparation of Lithium Secondary Battery>

$LiCoO_2$ as a cathode active material, polyvinylidene fluoride (PVdF) as a binder and carbon black as a conductive agent were mixed in a weight ratio of 96:2:2, and the mixture was dispersed in N-methyl-2-pyrrolidone, to obtain a slurry for a cathode. The slurry was coated on an aluminum current collector, followed by drying and compressing, to prepare a cathode.

A mixture of natural graphite and artificial graphite (90:10 (wt %)) as an anode active material, carbon black as a conductive agent, a styrene-butadiene rubber as a binder, and carboxymethylcellulose as a thickener were mixed in a weight ratio of 96.3:1:1.5:1.2 and dispersed in water, to obtain a slurry for an anode. The slurry was coated on a copper current collector, followed by drying and compressing, to prepare an anode.

Then, the cathode and the anode were assembled together with a polyethylene according to a conventional method to prepare a prismatic battery, in which the electrolyte solution prepared above was introduced. Thereby, a lithium secondary battery was finally prepared.

Comparative Examples 1 to 6

The procedures of Example 1 were repeated except that toluene, xylene or a mixture thereof was used in an amount listed in Table 1, to prepare a lithium secondary battery.
<Evaluation of Life Characteristic>

Lithium secondary batteries prepared in Examples 1 to 20 and Comparative Examples 1 to 6 were charged with a rate of 0.5 C until 4.2 V was reached and then the charging process was completed when the charging current reached a 1/20 thereof. After being left for 10 minutes, the batteries were discharged with a rate of 0.8 C until 3.0 V was reached. The charging/discharging was repeated 500 times. After 500 cycles, the capacity retention (%) relative to initial value for the batteries is shown in Table 1.

<Evaluation of Overcharging>

Five of each lithium secondary batteries prepared in Examples 1 to 20 and five of each lithium secondary batteries in Comparative Examples 1 to 6 were each evaluated for their states under the overcharging condition. Specifically, the batteries were charged with a rate of 0.5 C until 10 V was reached, and then maintained for 24 hours, to observe whether the explosion or ignition of the batteries occurred within the period of 24 hours, the opening of the vent hole occurred, and how many batteries passed without undergoing such undesirable events (i.e., the number of passed batteries). The results thereof are shown in Table 1.

TABLE 1

| | Toluene (Parts by weight) | Xylene (Parts by weight) | Pressure of Vent Hole (kgf) | Life (Capacity Retention (%) relative to Initial value after 500 Cycles) | Over-charging (Explosion/Ignition) | Over-charging (Opening of Vent Hole) | Number of Passed Batteries in Overcharging Test (for total 5 batteries) |
|---|---|---|---|---|---|---|---|
| Ex. 1 | 0.9 | 0.1 | 3.5 | 86.5% | 0/5 | 0/5 | 5 |
| Ex. 2 | 0.9 | 0.1 | 15.0 | 86.6% | 0/5 | 0/5 | 5 |
| Ex. 3 | 2.7 | 0.3 | 3.5 | 87.2% | 0/5 | 0/5 | 5 |
| Ex. 4 | 2.7 | 0.3 | 15.0 | 87.2% | 0/5 | 0/5 | 5 |
| Ex. 5 | 4.5 | 0.5 | 3.5 | 85.3% | 0/5 | 0/5 | 5 |
| Ex. 6 | 4.5 | 0.5 | 15.0 | 85.7% | 0/5 | 0/5 | 5 |
| Ex. 7 | 6.3 | 0.7 | 3.5 | 83.5% | 0/5 | 0/5 | 5 |
| Ex. 8 | 6.3 | 0.7 | 15.0 | 83.9% | 0/5 | 0/5 | 5 |
| Ex. 9 | 9.0 | 1.0 | 3.5 | 83.6% | 0/5 | 0/5 | 5 |
| Ex. 10 | 9.0 | 1.0 | 15.0 | 83.2% | 0/5 | 0/5 | 5 |
| Ex. 11 | 0.7 | 0.3 | 3.5 | 86.2% | 0/5 | 0/5 | 5 |
| Ex. 12 | 0.7 | 0.3 | 15.0 | 85.9% | 0/5 | 0/5 | 5 |
| Ex. 13 | 2.1 | 0.9 | 3.5 | 85.3% | 0/5 | 0/5 | 5 |
| Ex. 14 | 2.1 | 0.9 | 15.0 | 85.8% | 0/5 | 0/5 | 5 |
| Ex. 15 | 3.5 | 1.5 | 3.5 | 84.2% | 0/5 | 0/5 | 5 |
| Ex. 16 | 3.5 | 1.5 | 15.0 | 84.5% | 0/5 | 0/5 | 5 |
| Ex. 17 | 4.9 | 2.1 | 3.5 | 83.1% | 0/5 | 0/5 | 5 |
| Ex. 18 | 4.9 | 2.1 | 15.0 | 83.0% | 0/5 | 0/5 | 5 |
| Ex. 19 | 7.0 | 3.0 | 3.5 | 81.1% | 0/5 | 0/5 | 5 |
| Ex. 20 | 7.0 | 3.0 | 15.0 | 81.9% | 0/5 | 0/5 | 5 |
| Com. Ex. 1 | 0.0 | 0.0 | 15.0 | 85.5% | 5/5 | — | 0 |
| Com. Ex. 2 | 0.5 | 0.0 | 15.0 | 85.9% | 2/5 | 3/5 | 0 |
| Com. Ex. 3 | 13.0 | 0.0 | 3.5 | 71.1% | 0/5 | 0/5 | 5 |
| Com. Ex. 4 | 0.0 | 2.0 | 15.0 | 78.1% | 1/5 | 2/5 | 2 |
| Com. Ex. 5 | 0.5 | 4.5 | 3.5 | 52.7% | 0/5 | 1/5 | 4 |
| Com. Ex. 6 | 0.5 | 4.5 | 15.0 | 52.3% | 0/5 | 0/5 | 5 |

What is claimed is:

1. A lithium secondary battery, comprising a cathode, an anode, a non-aqueous solution containing a lithium salt and an organic solvent, and a safety vent for removing increased internal pressure,
wherein the safety vent has a vent hole whose opening pressure is in the range of 3.5 to 15 kgf/cm$^2$; and the non-aqueous solution further contains a mixture of halogen-substituted or unsubstituted toluene and halogen-substituted or unsubstituted xylene as an additive, the mixture having the halogen-substituted or unsubstituted toluene and the halogen-substituted or unsubstituted xylene in a weight ratio of 1:0.1 to 1:0.5.

2. The lithium secondary battery according to claim 1, wherein the halogen-substituted toluene is a compound having at least one substituent selected from F and Cl in the benzene ring or methyl group of toluene.

3. The lithium secondary battery according to claim 1, wherein the halogen-substituted xylene is a compound having at least one substituent selected from F and Cl in the benzene ring or methyl groups of xylene.

4. The lithium secondary battery according to claim 1, wherein the additive is contained in an amount of 1 to 10 parts by weight based on 100 parts by weight of the non-aqueous solution.

5. The lithium secondary battery according to claim 1, wherein the lithium salt has an anion selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

6. The lithium secondary battery according to claim 1, wherein the organic solvent is selected from the group consisting of a cyclic carbonate, a linear carbonate, a linear ester and a mixture thereof.

7. The lithium secondary battery according to claim 6, wherein the cyclic carbonate is selected from the group consisting of ethylene carbonate, propylene carbonate, 1,2-butylene carbonate, 2,3-butylene carbonate, 1,2-pentylene carbonate, 2,3-pentylene carbonate, vinylene carbonate, a halide thereof, and a mixture thereof.

8. The lithium secondary battery according to claim 6, wherein the linear carbonate is selected from the group consisting of dimethyl carbonate, diethyl carbonate, dipropyl carbonate, ethyl methyl carbonate, methyl propyl carbonate, ethyl propyl carbonate and a mixture thereof.

9. The lithium secondary battery according to claim 6, wherein the linear ester is selected from the group consisting of methyl acetate, ethyl acetate, propyl acetate, methyl propionate, ethyl propionate, propyl propionate, butyl propionate and a mixture thereof.

\* \* \* \* \*